United States Patent Office 3,431,291
Patented Mar. 4, 1969

3,431,291
(2-ALKYLIDENEALKANOYL)PHENOXY DERIVATIVES OF ACETONITRILE
Everett M. Schultz, Ambler, Pa., assignor to Merck & Co., Inc., Rahway, N.J., a corporation of New Jersey
No Drawing. Filed Dec. 27, 1965, Ser. No. 516,773
U.S. Cl. 260—465   8 Claims
Int. Cl. C07c *121/52*

ABSTRACT OF THE DISCLOSURE

[(2 - alkylidenealkanoyl)phenoxy]acetonitrile products wherein the alkanoyl radical may be substituted at the 2-carbon by alkyl, trihalomethylalkyl, cycloalkyl, aryl or aralkyl and wherein the nucleus of the instant products may be substituted by from one to four moieties selected from halogen trihalomethyl, lower alkyl or a divalent hydrocarbylene chain.

---

The products are prepared by treating the salt of a (2-alkylidenealkanoyl)phenol with an haloacetonitrile and have utility as diuretics and saluretics in the treatment of conditions associated with edema.

This invention relates to a new class of chemical compounds which can be described generally as substituted (2-alkylidenealkanoyl)phenoxy derivatives of acetonitrile.

Also, it is an object of this invention to describe a novel method of preparation for the foregoing [(12-alkylidenealkanoyl)phenoxy]acetonitriles.

Pharmacological studies show that the instant products are effective diuretic and saluretic agents which can be used in the treatment of conditions associated with electrolyte and fluid retention and hypertension. When administered in therapeutic dosages, in conventional vehicles, the instant products effectively reduce the amount of sodium and chloride ions in the body, lower dangerous excesses of fluid levels to acceptable limits and, in general, alleviate conditions usually associated with edema.

The [(2-alkylidenealkanoyl)phenoxy]acetonitriles of this invention are products having the following structural formula:

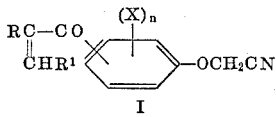

I wherein R is a member selected from the group consisting of hydrogen, lower alkyl, trihalomethyl substituted lower alkyl, cycloalkyl, aryl such as mononuclear aryl and aralkyl such as mononuclear aralkyl wherein the aromatic ring in the said aryl and aralkyl moieties may be optionally substituted by a member selected from the group consisting of halogen and lower alkyl; $R^1$ is a member selected from the group consisting of hydrogen and lower alkyl; X represents similar or dissimilar members selected from the group consisting of hydrogen, halogen, trihalomethyl, lower alkyl and, when substituted on adjacent carbon atoms to the benzene nucleus two X radicals may be combined to form an hydrocarbylene chain, i.e., a divalent organic radical composed solely of carbon and hydrogen, containing from three to four carbon atoms between their points of attachment, for example, 1,3-butadienylene (i.e., —CH=CH—CH=CH—), trimethylene (i.e., —CH$_2$—CH$_2$—CH$_2$—)

tetramethylene (i.e., —CH$_2$—CH$_2$—CH$_2$—CH$_2$—) and n is an integer having a value of one to four.

A preferred embodiment of this invention relates to a [4-(2-methylenealkanoyl)phenoxy]acetonitrile having the following structural formula:

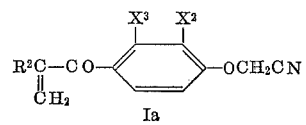

Ia wherein $R^2$ is a member selected from the group consisting of lower alkyl and trihalomethyl substituted lower alkyl and $X^2$ and $X^3$ are similar or dissimilar members selected from the group consisting of hydrogen, halogen trihalomethyl, lower alkyl and, taken together, may be joined to form a 1,3-butadienylene linkage. The foregoing class of compounds exhibits particularly good diuretic and saluretic activity and represents a preferred subgroup of compounds within the scope of this invention.

The [(2-alkylidenealkanoyl)phenoxy]acetonitriles (I) of this invention are conveniently prepared by the reaction of an alkali metal salt of a (2-alkylidenealkanoyl)phenol (II, infra) with a haloacetonitrile. The salt of the (2-alkyldienealkanoyl) phenol may be employed as such in the process or it may be prepared inherently, i.e., during the reaction, by treating a mixture of the (2-alkylidenealkanoyl)phenol and haloacetonitrile reactants with a reagent capable of forming salts with phenols as, for example, with an alkali metal carbonate, alkali metal alkoxide, etc. such as potassium carbonate, sodium ethoxide, etc. The following equation, wherein the (2-alkylidenealkanoyl)phenol salt is prepared inherently by treatment with potassium carbonate, illustrates the process; however, it will be appreciated that other basic reagents, i.e., other than potassium carbonate, can be employed in the reaction and that, if desired, the alkali metal salt of the (2-alkylidenealkanoyl)phenol may be employed directly in the synthesis:

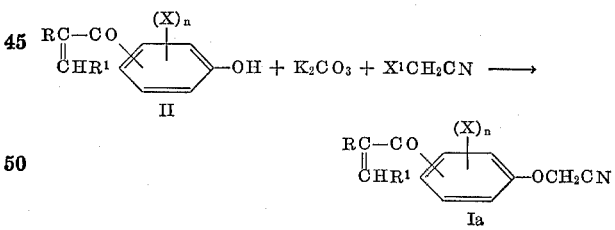

wherein R, X and n are as defined and $X^1$ is halogen such as chlorine, bromine, etc.

Temperature is not critical to the success of the reaction but, in general, the process is favored by the application of slight heating as, for example, by heating the reaction mixture at reflux temperatures for a short period.

The products I of the invention are usually obtained as liquids and, if desired, may be purified by extraction of the reaction mixture with ether and washing with an aqueous solution of sodium hydroxide and with water.

Those 2-alkylidenealkanophenone starting materials II of the instant process wherein $R^1$ represents hydrogen, are conviently prepared by the reaction of a nuclear hydroxy substituted alkanophenone with an appropriate aldehyde and with the acid addition salt of a secondary amine followed by the decomposition of the Mannich amine salt thus formed. According to this method an appropriate nuclear hydroxy substituted alkanophenone, illustrated by planar Formula III, infra, is first allowed to react with formaldehyde or paraformaldehyde and the acid addition salt of a di-lower alkylamine, piperidine or morpholine and the Mannich amine salt IV, infra thus formed is then converted directly to the corresponding nuclear hydroxy substituted 2-methylenealkanophenone IIa by decomposition as, for example, by heating the said Mannich salt at temperatures above room temperature and, preferably, in the presence of a solvent of high dielectric constant such as dimethylformamide or, alternatively, the salt of the Mannich amine IV is treated with a weak base, such as sodium bicarbonate, to obtain the corresponding free Mannich amine derivative V which is then decomposed to the desired nuclear hydroxy substituted 2-methylenealkanophenone IIa. Some of the Mannich amines V decompose at ambient temperature but, generally, decomposition is effected by slight heating. The following equation illustrates this method of preparation:

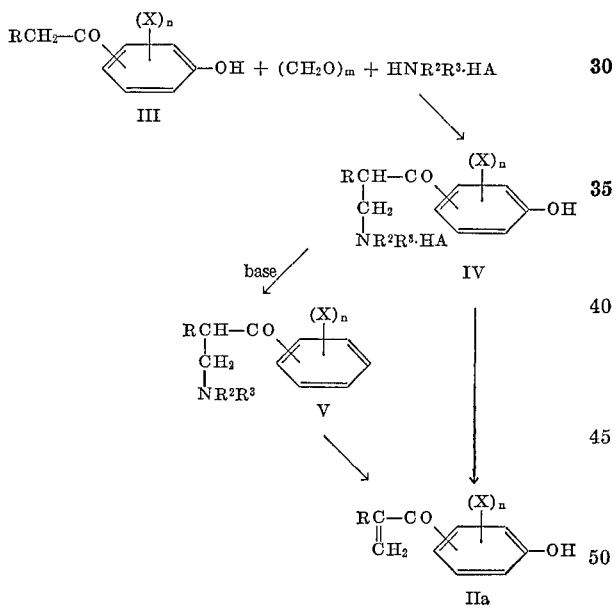

wherein R, X and $n$ are as defined above; $HNR^2R^3$ is a secondary amine, for example, an amine selected from the group consisting of di-lower alkylamine, piperidine and morpholine; HA is the moiety derived from an organic or inorganic acid capable of forming salts with amines, for example, hydrochloric acid, etc. and $m$ is an integer having a value of one or a number greater than one.

An alternate method for preparing the nuclear hydroxy substituted 2-methylenealkanophenones IIa also comprises treating an appropriate nuclear hydroxy substituted alkanophenone III with formaldehyde or paraformaldehyde and the salt of a secondary amine but, unlike the foregoing method which converts the Mannich amine salt IV, supra thus formed to the corresponding free Mannich amine V, supra and then to the desired nuclear hydroxy alkanophenone IIa, this alternate method consists in treating the Mannich amine V with a suitable quaternizing agent to obtain the corresponding quarternary ammonium salt VI, infra and then converting the said quarternary ammonium derivative to the desired nuclear hydroxy 2-methylenealkanophenone IIa by treatment with a base, for example, with an aqueous solution of sodium bicarbonate. The following equation illustrates this method of preparation:

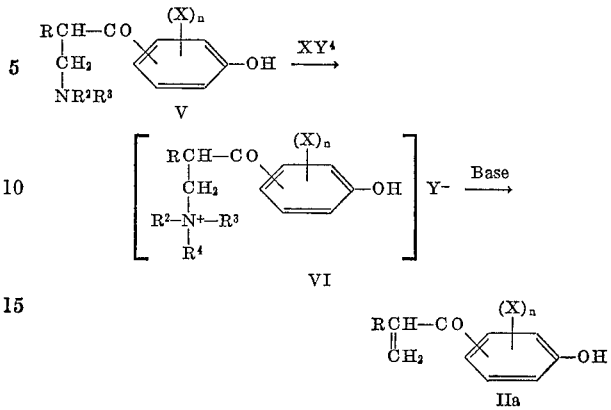

wherein R, $R^2$, $R^3$, X and $n$ are as defined above; $YR^4$ represents an hydrocarbyl halide, i.e., the halide derivative of an organic compound composed solely of carbon and hydrogen, for example, methylbromide, methyliodide, etc.; $R^4$ represents an hydrocarbyl radical, for example, lower alkyl, etc. and $Y^-$ represents the cation derived from an hydrocarbyl halide, for example, a bromide ion, an iodide ion, etc.

Another method for preparing the nuclear hydroxy 2-alkylidenealkanophenone II starting materials and one which is particularly suitable for preparing those compounds wherein the $R^1$ moiety is a lower alkyl radical, comprises treating a suitable nuclear hydroxy substituted alkanophenone VII with an halogenating agent, for example, with chlorine, bromine, iodine monochloride, etc., followed by the reaction of the halogenated derivative VIII, infra thus obtained with a dehydrohalogenating agent. Dehydrohalogenating reagents which are suitable in the process include, for example, tertiary amines, metal halides, alkali metal acetates, alkali metal carbonates, etc. Specifically, triethylamine, anhydrous lithium chloride, lithium bromide, silver acetate, potassium acetate, silver fluoride and potassium carbonate have been found to be particularly effective in the dehydrohalogenation reaction. The process is illustrated by the following equation:

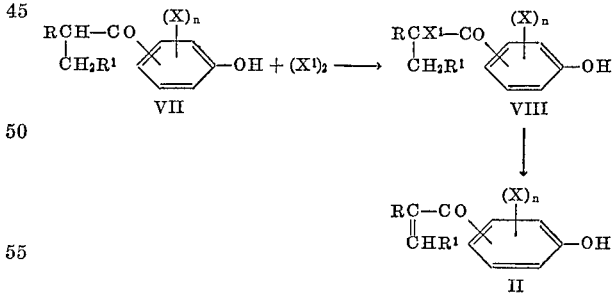

wherein R, $R^1$, X and $n$ are as defined above; $X^1$ is an halogen atom, for example, chlorine, bromine, etc. and $(X^1)_2$ is an halogenating agent such as chlorine, bromine, iodine monochloride, etc. In general, the dehydrohalogenation reaction may be carried out in any inert solvent in which the nuclear hydroxy substituted alkanophenone VII, 2-haloalkanophenone VIII and dehydrohalogenating agents are reasonably soluble, for example, in dimethylformamide, especially when lithium chloride or lithium bromide is the dehydrohalogenating agent employed.

When R in the nuclear hydroxy substituted alkanophenone (i.e., compound VII) of the preceding paragraph is a radical which contains at least one hydrogen atom on the carbon atom beta to the carbonyl group as, for example, when R is $R^5R^6CH-$ wherein $R^5$ and $R^6$ each represent lower alkyl, trihalomethyl substituted lower alkyl, aryl, aralkyl and, taken together with the carbon atoms to which they are attached, $R^5$ and $R^6$ are joined to form a cycloalkyl ring (particularly a cycloalkyl ring containing three to six nuclear carbon atoms), the reaction may take an alternate course resulting in the formation of an isomeric derivative having the following structure:

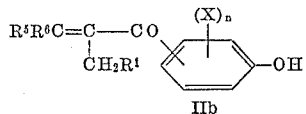

IIb wherein $R^1$, $R^5$, $R^6$, X and n are as defined above. Also, in lieu of obtaining the desired nuclear hydroxy substituted alkanophenone II or even the isomeric derivative IIb depicted above, it is possible that an isomeric mixture of products (i.e., II and IIb) may be obtained.

The nuclear hydroxy sustituted alkanophenones (III and VII) which are employed as starting materials in the foregoing reactions are either known compounds or may be prepared by methods which are known to those skilled in the art. One method involves the Friedel-Crafts reaction of an ether of an appropriate nuclear substituted or nuclear unsubstituted phenol such as nuclear substituted or nuclear unsubstituted anisole or phenetole, with an alkanoic acid halide in the presence of a metallic halide, followed by the hydrolysis of the nuclear etherified alkanophenone intermediate thus produced to obtain the desired nuclear hydroxy substituted alkanophenone (III, VII). Metallic halides which may be used in the Friedel-Crafts reaction include, for example, anhydrous aluminum chloride, etc.

It frequently occurs that the foregoing Friedel-Crafts reaction produces a mixture of the 2′ and the 4′ isomers of the nuclear hydroxy alkanophenone (III, VII) as, for example, when the phenol ether reactant is a 3-chloroanisole, 3-methylanisole, etc. In such an instance it is preferable to make no attempt at separating the 2′ and 4′ substituted ethers of the alkanophenone but, instead, convert the isomeric mixture to the corresponding mixture of nuclear hydroxy substituted alkanophenones and separate the said phenones by fractional distillation.

Another method for preparing the nuclear hydroxy substituted alkanophenone derivatives (III, VII) consists in the reaction of a Grignard reagent of the formula: $RCH_2MgX^1$ or $RCH(CH_2R^1)MgX^1$ wherein R, $R^1$ and $X^1$ are as defined above, with an appropriate formyl substituted phenol ether having the formula:

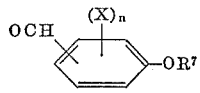

wherein X and n are as defined above and $R^7$ is lower alkyl such as methyl, ethyl, etc. The nuclear alkoxy substituted benzyl alcohol intermediate thus produced may then be oxidized to the corresponding ketone derivative and the ether group cleaved by conventional means to produce the desired nuclear hydroxy substituted alkanophenone. Oxidizing agents suitable for use in the process include, for example, chromium trioxide, etc. Although the Grignard method may be used to prepare all isomeric varieties of the nuclear hydroxy substituted alkanophenone reactants, i.e., the 2′, 3′ and 4′ nuclear hydroxy substituted alkanophenones, this method of preparation is a most convenient route for the preparation of the 3′-hydroxyalkanophenone isomer. For example, a 3-formylanisole will react with the appropriate Grignard reagent to produce a 3-methoxy substituted benzyl alcohol; the said alcohol is then oxidized to the corresponding ketone derivative and the methyl ether moiety thereof is hydrolyzed in the conventional manner to produce the desired nuclear hydroxy alkanophenone compound (III).

The nuclear hydroxy alkanophenone starting materials (III, VII) may also be prepared by the Fries rearrangement which comprises treating an appropriate phenol with an acid halide to produce the corresponding phenol-ester, followed by the heating of the said ester with aluminum chloride to effect a nuclear rearrangement which yields the corresponding nuclear hydroxy substituted alkanophenone. The foregoing method of preparation is most suitable for preparing those alkanophenone reactants which contain the hydroxy group in the 2′ position of the alkanophenone nucleus but, those skilled in the art will perceive that the Fries method of rearrangement may also be used to prepare the 4′-hydroxyalkanophenone isomers under the appropriate conditions. For example, a phenol containing a nuclear substituent in the 2 and 6 positions, such as a 2, 3-dichlorophenol, may be allowed to react with an appropriate acid halide to produce the corresponding acid ester of the phenol and the said ester may then be converted to the desired 4′-hydroxyalkanophenone by heating in the presence of aluminum chloride.

A preferred method for preparing the nuclear hydroxy substituted alkanophenone starting materials (III, VII) consists in first nitrating an appropriate nuclear substituted or nuclear unsubstituted alkanophenone by conventional means as, for example, with fuming nitric acid to produce the corresponding 3′-nitroalkanophenone intermediate; reducing the said nitro compound to its amine counterpart and converting the amine to the desired 3′-hydroxyalkanophenone derivative.

Still another method for the synthesis of the nuclear hydroxy substituted alkanophenone reactants consists in treating a 4-bromophenol with an alkali metal hydroxide to obtain the corresponding alkali metal phenolate (IX, infra), followed by the reaction of the said phenolate with a suitable alkyl halide in glyme (i.e., glycol dimethyl ether) to obtain the corresponding ether of the 4-bromophenol (X, infra); the halogenated phenol-ether thus obtained then is allowed to react with magnesium metal in ether, the reaction mixture treated with a suitable aldehyde such as an aldehyde of the formula: $R^8CHO$ wherein $R^8$ is as defined hereinbelow; the 4-(1-hydroxyalkyl)phenol-ether (XI, infra) thus produced then is oxidized in the presence of chromium trioxide or other suitable oxidizing agent to yield the corresponding nuclear etherified alkanophenone (XII, infra) and the etherified derivative thus obtained is hydrolyzed in the conventional manner to the desired 4′-hydroxyalkanophenone compound (XIII, infra). The following equation illustrates this method of preparation:

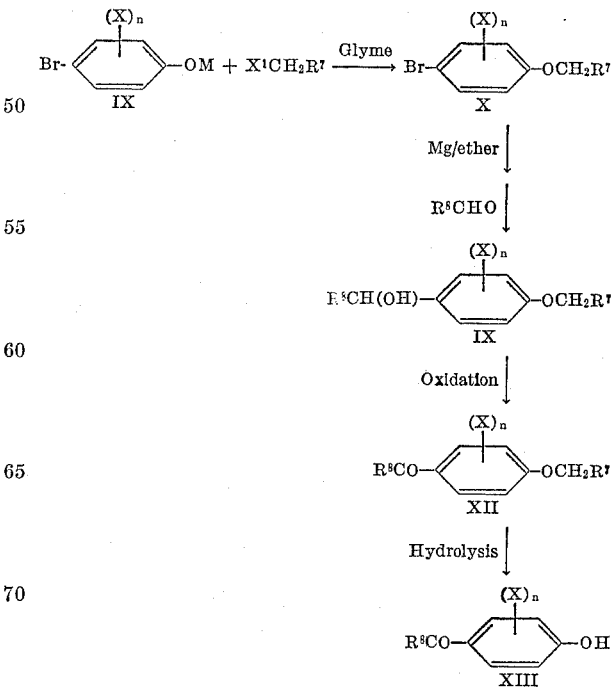

wherein $R^7$, X, $X^1$ and n are as defined above and $R^8$ is a member selected from the group consisting of $RCH_2$— and $RCH(CH_2R^1)$—wherein R and $R^1$ are as defined above.

The preparative method described in the preceding paragraph is an advantageous method for the preparation of the nuclear trifluoromethyl substituted hydroxyalkanophenones. However, it should be understood that the process is not limited to the preparation of the trifluoromethyl substituted hydroxy-alkanophenone compounds but is, in fact, suitable for preparing other starting materials of the invention.

The examples which follow illustrate the [(2-alkylidenealkanoyl)phenoxy]acetonitriles (I) of this invention and the method by which they are prepared. However, the examples are illustrative only and it should be apparent to one having only ordinary skill in the art that all of the products embraced by Formula I, supra, may also be prepared in an analogous manner by substituting the appropriate starting materials for those set forth in the examples.

EXAMPLE I

[3-chloro-4-(2-methylenebutyryl)phenoxy]acetonitrile

STEP A: 3-CHLOROANISOLE

A three liter 4-necked flask is fitted with a mechanical stirrer, reflux condenser, thermometer and two graduated dropping funnels. The flask is charged with 10 N sodium hydroxide (200 ml., 2 mole), methanol (400 ml.) and m-chlorophenol (257 g., 2 mole). The flask is fitted with a steam bath, the stirrer is started and the steam regulated so that a gentle reflux is maintained throughout the reaction period. The initial reaction temperature is 55–60° C., at the end of the reaction it is 75–80° C.

One dropping funnel is charged with methyl sulfate (652 ml., 880 g., 6.98 mole) and the other with 10 N sodium hydroxide (500 ml., 5 mole). The two solutions are added simultaneously to the reaction mixture, taking care that the mixture remains alkaline throughout the reaction period. The addition requires 2½ hours.

After refluxing for an additional hour, the mixture is cooled and poured into cold water (2 liters). The upper, organic phase, is separated in a separatory funnel and the aqueous phase thrice extracted with 400 ml. portions of ether. The combined ether and organic phases are dried over anhydrous sodium sulfate.

The ether is removed by distillation and the residue fractionated at reduced pressure using a still with a 30 inch column. The fraction boiling at 65–67° C./7–8 mm. (78–80° C./15 mm. or 81–83° C./18–20 mm.) is collected. The yield varies from 263 g. (92%) to 281 g. (99%) of 3-chloroanisole.

STEP B: 2-CHLORO-4'-METHOXYBUTYROPHENONE

A 2-liter resin flask is fitted with a mechanical stirrer, thermometer, reflux condenser capped with a calcium chloride drying tube and an Erlenmeyer flask attached via Gooch tubing. The apparatus is oven dried and assembled while hot. The system is flushed with dry nitrogen and petroleum ether (750 ml.; which has previously been dried overnight over anhydrous aluminum chloride) is placed in the flask. m-Chloroanisole (213.9 g., 1.5 mole) and butyryl chloride (191.8 g., 1.8 mole) are added and the stirrer started. Anhydrous aluminum chloride (200 g., 1.5 mole) is placed in the Erlenmeyer flask and added, portionwise, to the reaction mixture over 30 minutes.

The reaction mixture gradually changes from a pale yellow color to dark orange. Finally a red oil begins to separate. After the addition is complete, stirring is continued for another two hours. Throughout the entire period of reaction, there is a vigorous evolution of hydrogen chloride. During the reaction, the temperature does not exceed 30° C.

The reaction mixture now consists of two layers. The upper, benzin layer, is decanted off and discarded. The viscous bottom layer is poured into a mixture of crushed ice (1 kg.) and concentrated hydrochloric acid (450 ml.).

After the ice has melted, the oil is separated from the aqueous phase and the latter thrice extracted with 500 ml. portions of ether. The combined organic and ether extracts are washed, first with 150 ml. of 5% hydrochloric acid, then twice with 150 ml. portions of water and finally dried over anhydrous sodium sulfate. The ether is removed by distillation and the residue distilled at reduced pressure using a still with a 30 inch column.

The fraction boiling at 100–110° C./0.1 mm. (122–138° C./1.5–2.9 mm.) is collected. The yield is 298 g. (94%). The product consists of a mixture of 2'-chloro-4'-methoxybutyrophenone and 2'-methoxy-4'-chlorobutyrophenone in about equal portions. Separation at this stage is difficult to obtain by the usual techniques. However, the corresponding phenols are easily separated, therefore the mixture is used for the following step.

STEP C: 2'-CHLORO-4'-HYDROXYBUTYROPHENONE

A two-liter resin flask is equipped and assembled as described for the above reaction. n-Heptane (1500 ml.) is dried overnight over anhydrous aluminum chloride and placed in the reaction vessel with the mixture of 2'-chloro-4'-methoxybutyrophenone and 2'-methoxy-4'-chlorobutyrophenone prepared in Step B (298.6 g., 1.4 mole). The stirrer is started and the aluminum chloride (373.4 g., 2.8 mole) is added over a period of 15 minutes. The temperature rises from 20° C. to 55° C.

The reaction mixture is refluxed for three hours using a steam bath as a heat source. There is a vigorous evolution of hydrogen chloride during this period and a viscous brown glass separates. Stirring becomes more difficult as the reaction progresses and may even have to be terminated. The reaction mixture is cooled to room temperature and the upper, heptane, phase decanted off. The residue is treated with a mixture of crushed ice (1 kg.) and concentrated hydrochloric acid (600 ml.). (A considerable amount of stirring and scraping is required to cause the aluminum complex to decompose.)

The mixture containing a yellow solid is thrice extracted with 500 ml. portions of ether. The combined ether extracts are washed with two 250 ml. portions of water and dried over anhydrous sodium sulfate. The ether is removed by distillation and the residue fractionated. The first fraction, B.P. 145° C./0.03 mm. (155° C./0.2 mm.), contains 2'-hydroxy-4'-chlorobutyrophenone and the second fraction, B.P. 160–178° C./0.03 mm. (155–175° C./0.2 mm.), is quite pure 2'-chloro-4'-hydroxybutyrophenone. The yield is 138 g. of 2'-chloro-4'-hydroxybutyrophenone which quickly solidifies upon cooling. Recrystallization of this material from cyclohexane (about 2 liters) gives a white crystalline product, M.P. 82.5–84° C. A second recrystallization gives little change in M.P.

Analysis for $C_{10}H_{11}ClO_2$.—Calculated: C, 60.46; H, 5.58; Cl, 17.85. Found: C, 60.15; H, 5.66; Cl, 17.77.

STEP D: 2-DIMETHYLAMINOMETHYL-2'-CHLORO-4'-HYDROXYBUTYROPHENONE

A 250 ml. round-bottomed flask is charged with 2'-chloro-4'-hydroxybutyrophenone (73.2 g., 0.368 mole), paraformaldehyde (14.4 g., 0.467 mole), dimethylamine hydrochloride (40 g., 0.475 mole), absolute ethyl alcohol (70 ml.) and concentrated hydrochloric acid (1.5 ml.). The solution is heated under anhydrous conditions at reflux for three hours and then the alcohol is removed in vacuo. The residual oil is shaken with water (120 ml.) and ether (100 ml.). The product separates from the water phase on standing. After recrystallization from water the product, 2-dimethylaminoethyl-2'-chloro-4'-hydroxybutyrophenone, melts at 89–92° C.

Analysis for $C_{13}H_{18}NClO_2 \cdot HCl$.—Calculated: C, 53.43; H, 6.55; N, 4.79. Found: C, 52.94; H, 6.48; N, 4.59.

STEP E: 2-METHYLENE-2'-CHLORO-4'-HYDROXYBUTYROPHENONE

The 2 - dimethylaminomethyl - 2' - chloro-4'-hydroxybutyrophenone of Step D is dissolved in 120 ml. of aqueous saturated sodium bicarbonate, kept 24 hours at room temperature, acidified with concentrated hydrochloric acid and extracted with ether. The ether is dried over sodium sulfate and the residue distilled to give 16 g. of 2-methylene - 2′-chloro-4′-hydroxybutyrophenone which boils at 173° C./0.04 mm. and melts at 47–49° C.

Analysis for $C_{11}H_{11}ClO_2$.—Calculated: C, 62.71; H, 5.26. Found: C, 62.21; H, 5.20.

STEP F: [3-CHLORO-4-(2-METHYLENEBUTYRYL) PHENOXY]ACETONITRILE

Chloroacetonitrile (4.53 g., 0.06 mole) is dissolved in methyl ethyl ketone (10 ml.) and potassium iodide (0.02 g.) is added. The mixture is kept in the dark for 17½ hours and then added dropwise over a period of 45 minutes to a stirred refluxing mixture of 2-methylene-2′-chloro-4′-hydroxybutyrophenone (8.4 g., 0.04 mole) and potassium carbonate (5.25 g.). After heating one additional hour the mixture is cooled and water (50 ml.) and ether (50 ml.) are added. The ether layer is separated and washed with 2½% sodium hydroxide solution (100 ml.) and with water and dried over magnesium sulfate. The ether is evaporated and the residue distilled to obtain 3.95 g. of [3-chloro-4-(2-methylenebutyryl)phenoxy]acetonitrile, B.P. 157–163° C. (0.25 mm.)

Analysis for $C_{13}H_{12}ClNO_2$.—Calculated: C, 62.53; H, 4.85; N, 5.61. Found: C, 62.57; H, 8.89; N, 5.50.

EXAMPLE 2

[2,3-dichloro-4-(2-methylenebutyryl)phenoxy]acetonitrile

STEP A: 2,3-DICHLOROANISOLE

A five-liter, 4-necked round-bottomed flask is equipped with a stirrer, reflux condenser and two dropping funnels, 2,3-dichlorophenol (400 ml.) and 10 N sodium hydroxide (245 ml., 2.45 mole) are added. The temperature rises to 55° C. The mixture is heated to 80–85° C., on a steam bath and 10 N sodium hydroxide (615 ml., 6.15 mole) is placed in one dropping funnel and dimethyl sulfate (816 ml., 1090 g., 8.6 mole) in the other. The base and dimethyl sulfate are then added simultaneously in a dropwise manner over 3½ hours with stirring. Heating and stirring then is continued for one hour. The mixture then is cooled and water (600 ml.) is added. The oil that separates soon solidifies. The solid is collected by filtration and dissolved in ether (500 ml.). The filtrate is extracted with ether (400 ml.), the two ether solutions are combined and dried over anhydrous sodium sulfate. The ether is evaporated and the residue is dried in a vacuum desiccator over phosphorus pentoxide. The yield is 428 g. (98%) of 2,3-dichloroanisole, M.P. 32–33° C.

STEP B: 2′,3′-DICHLORO-4′-HYDROXYBUTYROPHENONE

Butyryl chloride (128.0 g., 1.2 mole), 2,3-dichloroanisole (197.7 g., 1.11 mole), prepared as described in Step A, and carbon disulfide (400 ml.) are placed in a four-necked flask fitted with a mechanical stirrer, thermometer, reflux condenser (protected by a calcium chloride tube) and a Gooch sleeve bearing a 250 ml. Erlenmeyer flask containing anhydrous aluminum chloride (160 g., 1.2 mole). While the reaction mixture is cooled in an ice bath, the aluminum chloride is added in small portions with stirring at such a rate that the temperature of the reaction mixture does not exceed 20–25° C. The ice bath is removed and the mixture is stirred at room temperature for one hour, then in a water bath at 55° C. for 45 minutes and then kept at room temperature overnight.

n-Heptane (400 ml.) and aluminum chloride (160 g., 1.2 mole) then are added. The condenser is set for distillation, the mixture is stirred and heated in a water bath heated by means of a steam bath and the carbon disulfide is distilled off. A second portion of heptane (400 ml.) is added, the condenser is set for reflux, the reaction mixture is stirred and heated in a bath at 80° C. for three hours and then allowed to cool. The heptane is decanted and the residue hydrolyzed by the slow addition of a solution of concentrated hydrochloric acid (120 ml.) in water (1500 ml.). The brown solid that separates is collected by suction filtration, washed well with water and dissolved in ether. The ether solution is extracted twice with a total of two liters of 5% sodium hydroxide. The sodium hydroxide extract is stirred with decolorizing carbon (2–3 teaspoons) and filtered by suction through a pad of diatomaceous earth. Upon acidification, a light brown solid separates. This is collected by filtration, washed with water and dried at 100° C. for three hours.

The dried solid is dissolved in hot benzene (1 liter) and the insoluble matter is removed by filtration. Upon cooling, a slightly colored solid separates. This is dissolved in hot benzene (750 ml.), the solution is allowed to cool to room temperature and then chilled to 10° C. in a refrigerator. The product (203 g., 85%); M.P. 109–110.5° C., is collected by filtration. The product is taken up in 1500 ml. of hot benzene, treated with decolorizing carbon and filtered. Upon cooling, a white solid identified as 2′,3′-dichloro - 4′-hydroxybutyrophenone (180 g., 75%), M.P. 109–110° C., separates.

Analysis for $C_{10}H_{10}Cl_2O_2$.—Calculated: C, 51.52; H, 4.32; Cl, 30.42. Found: C, 51.70; H, 4.24; Cl, 30.32.

STEP C: 2-DIMETHYLAMINOMETHYL-2′,3′-DICHLORO-4′-HYDROXYBUTYROPHENONE HYDROCHLORIDE

2′,3′ - dichloro-4′-hydroxybutyrophenone (46.62 g., 0.2 mole), paraformaldehyde (12.01 g., 0.4 mole), dimethylamine hydrochloride (32.62 g., 0.4 mole), concentrated hydrochloric acid (1 ml.) and absolute ethanol (46 ml.) are combined and heated under reflux, protected from moisture, for three hours.

After standing overnight at room temperature, the reaction solution is concentrated under reduced pressure to a viscous oil. The residual oil is triturated with water (150 ml.) and filtered to remove a white solid which is shown to be starting phenol (29% recovered). The aqueous filtrate is extracted with ether and then concentrated to dryness under reduced pressure to give 62.3 g. of 2-dimethylaminomethyl-2′,3′-dichloro-4′-hydroxybutyrophenone hydrochloride, a white solid, M.P. 130–150° C.

Two recrystallizations from absolute ethanol give 27.3 g. (59%) of 2 - dimethylaminomethyl-2′,3′-dichloro-4′-hydroxybutyrophenone melting at 156–159° C.

Analysis for $C_{13}H_{17}Cl_2NO_2(HCl)$.—Calculated: C, 47.80; H, 5.55; N, 4.29. Found: C, 47.77; H, 5.55; N, 4.25.

STEP D: 2-METHYLENE-2′,3′-DICHLORO-4′-HYDROXYBUTYROPHENONE

2 - dimethylaminomethyl - 2′,3′ - dichloro - 4′-hydroxybutyrophenone hydrochloride (1.0 g., 0.00306 mole) is dissolved in water (25 ml.) and the solution made basic by the addition of saturated sodium bicarbonate solution. The colorless solution is heated on a steam bath (80–90° C.) for 30 minutes, cooled and made acid to Congo red test paper by the addition of 6 N hydrochloric acid. The resulting semisolid is extracted with ether and the combined extracts are dried over anhydrous magnesium sulfate. The ether is evaporated under reduced pressure to give 0.65 g. (85%) of 2 - methylene-2′,3′-dichloro-4′-hydroxybutyrophenone, M.P. 82–84° C.

Two recrystallizations from hexane give 2-methylene-2′,3′-dichloro-4′-hydroxybutyrophenone in the form of white prisms melting at 84–85° C.

Analysis for $C_{11}H_{10}Cl_2O_2$.—Calculated: C, 53.90; H, 4.11; Cl, 28.93. Found: C, 53.78; H, 3.96; Cl, 29.03.

STEP E: [2,3-DICHLORO-4-(2-METHYLENEBUTYRYL) PHENOXY]-ACETONITRILE

To a refluxing mixture of 2-methylene-2′,3′-dichloro-4′-hydroxybutyrophenone (9.80 g., 0.04 mole), potassium carbonate (5.52 g., 0.02 mole) and 2-butanone (20 ml.), is added a suspension (after being permitted to stand in the dark for 18 hours) of chloroacetonitrile (4.53 g., 0.06 mole), potassium iodide (20 mg.) and 2-butanone (10 ml.). The addition requires 45 minutes and refluxing with vigorous stirring is continued for two hours longer.

The cooled reaction mixture is treated with water (50 ml.) and the resulting oil is extracted with ether. The combined ether extracts are washed with a 1% aqueous sodium hydroxide solution, then with water and finally dried over anhydrous magnesium sulfate. The ether is evaporated under reduced pressure to give an oily residue. The residue is fractionally distilled to give 9.66 g. (85%) of a viscous liquid, B.P. 170–172°/0.2 mm.

Analysis for $C_{13}H_{11}Cl_2NO_2$.—Calculated: C, 54.95; H, 3.90; Cl, 24.96; N, 4.93. Found: C, 54.89; H, 3.96; Cl, 24.76; N, 4.73.

EXAMPLE 3

[2,3-dichloro-4-(2-ethylidenebutyryl)phenoxyl] acetonitrile

STEP A: 2-ETHYL-2′,3′-DICHLORO-4′-HYDROXY-BUTYROPHENONE

A mixture of 2,3-dichloroanisole (53.11 g., 0.3 mole), carbon disulfide (350 ml.) and 2-ethylbutyryl chloride (80.77 g., 0.6 mole) is treated, under anhydrous conditions, with aluminum chloride powder (40.00 g., 0.3 mole) over a period of five minutes with stirring. The mixture is stirred for six hours at room temperature and then allowed to stand at room temperature overnight. The reaction mixture is heated with stirring in a 55° C. water bath until the evolution of hydrogen chloride ceases (1½ hours), cooled to room temperature and treated, under anhydrous conditions, with aluminum chloride powder (40.00 g., 0.3 mole) over a period of five minutes with stirring. The carbon disulfide is removed by distillation, an equal volume of dry heptane is added and the mixture is heated on a steam bath with stirring for three hours. After cooling to room temperature the heptane is decanted and the gummy residue is added to a mixture of ice (450 g.) and concentrated hydrochloric acid (45 ml.). The resulting oil is extracted with ether, dried over anhydrous sodium sulfate and the ether then removed under reduced pressure to give a semi-solid residue. This material is treated with excess 5% aqueous sodium hydroxide solution and heated under reflux for one hour, then cooled and extracted with ether to remove insoluble oil. The clear aqueous solution is acidified with concentrated hydrochloric acid and the residual oil is distilled to give 34.45 g. (44%) of 2 - ethyl-2′,3′-dichloro-4′-hydroxybutyrophenone in the form of a liquid, B.P. 140–142° C. at 0.5 mm. pressure. After three recrystallizations from hexane, 2-ethyl-2′,3′-dichloro-4′-hydroxybutyrophenone is obtained in the form of white needles, M.P. 85–86° C.

Analysis for $C_{12}H_{14}Cl_2O_2$.—Calculated: C, 55.19; H, 5.40; Cl, 27.15. Found: C, 55.21; H, 5.64; Cl, 26.98.

STEP B: 2-BROMO-2-ETHYL-2′,3′-DICHLORO-4′-HYDROXYBUTYROPHENONE

To a solution of 2-ethyl-2′,3′-dichloro-4′-hydroxybutyrophenone (522 mg., 0.002 mole) in glacial acetic acid (15 ml.) is added a solution of bromine (319 mg., 0.002 mole) in glacial acetic acid (5 ml.), dropwise, over a period of 15 minutes. (The reaction in initiated by adding a drop of 48% hydrobromic acid solution at the beginning of the addition period.) Stirring is continued for an additional 15 minutes at room temperature.

The colorless reaction solution is poured into water (80 ml.) containing sodium bisulfite (80 mg.). The resulting white solid is collected, washed with water and dried. The yield is 643 mg. (95%) of product, M.P. 120.5–122.5° C. Recrystallization from a mixture of hexane and benzene gives prisms of 2-bromo-2-ethyl-2′,3′ - dichloro-4′-hydroxybutyrophenone, M.P. 122.5–123.5° C.

Analysis for $C_{12}H_{13}BrCl_2O_2$.—Calculated: C, 42.38; H, 3.85; Br, 23.50; Cl 20.85. Found: C, 42.57; H, 3.92; Br, 23.38; Cl, 20.74.

STEP C: 2-ETHYLIDENE-2′,3′-DICHLORO-4′-HYDROXY-BUTYROPHENONE

A mixture of 2-bromo-2-ethyl-2′,3′-dichloro-4′-hydroxybutyrophenone (430 mg., 0.00126 mole), lithium chloride (160 mg., 0.00378 mole) and dimethylformamide (3 ml.) is heated on a steam bath, with stirring for 2¼ hours.

The cooled reaction solution is poured, with stirring, into water (45 ml.). The resulting white solid is collected, washed with water and dried. The yield is 308 mg. (94%) of 2-ethylidene-2′,3′-dichloro-4′-hydroxybutyrophenone, M.P. 117–119° C. Two recrystallizations from a mixture of hexane and benzene gives prisms of 2-ethylidene-2′,3′-dichloro-4′-hydroxybutyrophenone, M.P. 120–121° C.

Analysis for $C_{12}H_{12}Cl_2O_2$.—Calculated: C, 55.62; H, 4.67; Cl, 27.36. Found: C, 55.50; H, 4.71; Cl, 27.35.

STEP D: [2,3-DICHLORO-4-(2-ETHYLIDENEBUTYRYL) PHENOXY]-ACETONITRILE

By substituting 2-ethylidene-2′,3′-dichloro-4′-hydroxybutyrophenone for the 2-methylene-2′-chloro-4′-hydroxybutyrophenone of Example 1, Step F, and following substantially the procedure described therein, the product [2,3 - dichloro-4-(2-ethylidenebutyryl)phenoxy]acetonitrile is obtained.

EXAMPLE 4

[2,3-dimethyl-4-(2-methylenebutyryl)phenoxy] acetonitrile

STEP A: 2′,3′-DIMETHYL-4′-HYDROXYBUTYROPHENONE

To a well-stirred solution of butyryl chloride (60 g., 0.5 mole) and 2,3-dimethylanisole (68.09 g., 0.5 mole) in carbon disulfide (250 ml.), aluminum chloride (66.6 g., 0.5 mole) is added in portions during one hour. The reaction is very vigorous and hydrogen chloride is evolved. When the initial reaction is over the mixture is heated in a water bath at 55° C. for 1½ hours. Then a second portion of aluminum chloride (66.6 g.) is added, followed by 200 ml. of heptane and two ml. of dimethyl formamide. The condenser is set for downward distillation and the carbon disulfide is distilled. Heptane (100 ml.) is added and the mixture is heated at 90–100° C. for 3½ hours. After cooling the flask in an ice bath the heptane is decanted. The mixture in the flask is hydrolyzed by addition of ice (400 g.) followed by the addition of concentrated hydrochloric acid (100 ml.). The black, gummy material that forms is extraced with ether. The ether extract is washed with 6 N hydrochloric acid and water. The ether is evaporated and the residue is heated at 90–100° C. with 5% sodium hydroxide (500 ml.) for three hours to hydrolyze any phenolic ester present. The cooled mixture is extracted with ether and the basic aqueous solution obtained is filtered through a layer of diatomaceous earth and acidified with hydrochloric acid. The solid that separates is crystalized from benzene (125 ml.) to give 32 g. of 2′,3′-dimethyl-4′-hydroxybutyrophenone which melts at 100–102° C.

Analysis for $C_{12}H_{16}O_2$.—Calculated: C, 74.97; H, 8.39. Found: C, 74.59; H, 7.89.

STEP B: 2-PIPERIDINOMETHYL-2′,3′-DIMETHYL-4′-HYDROXYBUTYROPHENONE HYDROCHLORIDE

2′,3′-dimethyl-4′-hydroxybutyrophenone (15.6 g., 0.08 mole), piperidine hydrochloride (9.22 g., 0.08 mole), paraformaldehyde (2.4 g., 0.08 mole) and glacial acetic acid (1 ml.) are mixed and heated at 90–100° C. for 3½ hours. The mixture then is extracted with 500 ml. of boiling water and the aqueous mixture is cooled and extracted with ether and made basic by the addition of solid sodium bicarbonate. The oil that separates is taken up in ether. The solution is dried over sodium sulfate and acidified with alcoholic hydrogen chloride to obtain 18 g.

of 2-piperidinomethyl-2',3' - dimethyl-4'-hydroxybutyrophenone hydrochloride, M.P. 132–137° C. After drying over phosphorous pentoxide at one mm. pressure for a 24-hour period the 2-piperidinomethyl - 2',3' - dimethyl-4'-hydroxybutyrophenone hydrochloride has a melting point of 158–162° C.

Analysis for $C_{18}H_{28}ClNO_2$.—Calculated: C, 66.33; H, 8.66; N, 4.30. Found: C, 66.00; H, 8.38; N, 4.27.

STEP C: 1-[2-(2,3-DIMETHYL-4-HYDROXYBENZOYL) BUTYL]-1-METHYLPIPERIDINIUM IODIDE 2-piperidinomethyl - 2',3' - dimethyl - 4'-hydroxybutyrophenone hydrochloride (18.0 g., 0.055 mole) is suspended in water and the mixture is made basic by the addition of 10% sodium bicarbonate solution. The oil that separates is extracted with ether and the ether extract is dried and evaporated. To the residual oil is added 150 ml. of absolute alcohol and 36 ml. of methyl iodide. After refluxing for 1½ hours the mixture is cooled and absolute ether is added until no more precipitate forms. The oil that separates soon solidifies. Recrystallization of the solid from absolute ethanol gives 1-[2-(2,3-dimethyl-4 - hydroxybenzoyl)butyl]-1-methylpiperidinium iodide, M.P. 195–196° C.

Analysis for $C_{19}H_{30}INO_2$.—Calculated: C, 52.90; H, 7.00; N, 3.25. Found: C, 53.13; H, 6.98; N, 3.45.

STEP D: 2-METHYLENE-2',3'-DIMETHYL-4'-HYDROXYBUTYROPHENONE

The 1 - [2 - (2,3 - dimethyl-4-hydroxybenzoyl)butyl]-1-methylpiperidinium iodide obtained in Step C is dissolved in four liters of water and the solution made basic with sodium bicarbonate, heated at 80–90° C. for ½ hour, cooled and acidified with hydrochloric acid. The solid that separates is crystallized from a large volume of ligroin to obtain 4.46 g. of 2 - methylene-2',3'-dimethyl-4'-hydroxybutyrophenone, M.P. 73–74° C.

Analysis for $C_{13}H_{16}O_2$.—Calculated: C, 76.44; H, 7.90. Found: C, 76.61; H, 7.81.

STEP E: [2,3-DIMETHYL-4-(2-METHYLENEBUTYRYL) PHENOXY]-ACETONITRILE

By substituting 2 - methylene - 2',3' - dimethyl - 4' - hydroxybutyrophenone for the 2 - methylene - 2' - chloro-4' - hydroxybutyrophenone of Example 1, Step F, and following substantially the procedure described therein, the product [2,3 - dimethyl - 4 - (2 - methylenebutyryl) phenoxy]acetonitrile is obtained.

EXAMPLE 5

(3-chloro-4-acryloylphenoxy)acetonitrile

STEP A: 2'-CHLORO-4'-HYDROXYPROPIOPHENONE

By substituting an equimolar amount of propionyl chloride for the butyryl chloride employed in Example 1, Step B, and following substantially the procedure described in Steps B and C of Example 1, there is obtained 2' - chloro - 4' - hydroxypropiophenone, M.P. 92–93° C.

Analysis for $C_9H_9ClO_2$.—Calculated: C, 58.55; H, 4.91; Cl, 19.21. Found: C, 58.37; H, 5.26; Cl, 18.95.

STEP B: 2-DIMETHYLAMINOMETHYL-2'-CHLORO-4'-HYDROXYPROPIOPHENONE

A solution of 2' - chloro - 4' - hydroxypropiophenone (34.0 g., 0.184 mole), paraformaldehyde (7.2 g., 0.24 mole), dimethylamine hydrochloride (20.0 g., 0.245 mole) and 0.75 ml. of concentrated hydrochloric acid in absolute ethanol (30 ml.) are refluxed for two hours. On cooling, crude 2-dimethylaminomethyl - 2' - chloro - 4' - hydroxypropiophenone separates as a granular solid. The solid is slurried with absolute ethanol (50 ml.), collected by filtration and washed with ether to obtain 35.1 g. of 2 - dimethylaminomethyl - 2' - chloro - 4' - hydroxypropiophenone. After crystallization from absolute alcohol the product melts at 145–146° C.

Analysis for $C_{12}H_{17}Cl_2NO_2$.—Calculated: C, 51.81; H, 6.16; N, 5.03. Found: C, 51.95; H, 6.21; N, 5.15.

STEP C: 2-METHYL-2'-CHLORO-4'-HYDROXYACRYLOPHENONE

2 - dimethylaminomethyl - 2' - chloro - 4' - hydroxypropiophenone (20.25 g., 0.073 mole) is dissolved in a minimum amount of water (70 ml.) and 10% sodium bicarbonate (20 ml.) is added. After ½ hour, the mixture is acidified with hydrochloric acid and the yellow, pasty solid that separates is extracted with ether. The aqueous phase is again made basic by the addition of solid sodium bicarbonate, maintained at room temperature for 16 hours and acidified and extracted with ether. The combined ether extracts are dried over sodium sulfate and evaporated. The residue is crystallized from ether-ligroin to obtain 7.8 g. of 2 - methyl - 2' - chloro-4'-hydroxy - acrylophenone, M.P. 75.5–76.5° C.

Analysis for $C_{10}H_9ClO_2$.—Calculated: C, 61.08; H, 4.61; Cl, 18.03. Found: C, 60.75; H, 4.81; Cl, 17.91.

STEP D: (3-CHLORO-4-ACRYLOYLPHENOXY) ACETONITRILE

By substituting 2 - methyl - 2' - chloro - 4' - hydroxyacrylophenone for the 2 - methylene - 2' - chloro - 4' - hydroxybutyrophenone of Example 1, Step F, and following substantially the procedure described therein, the product (3 - chloro - 4 - acryloylphenoxy)acetonitrile is obtained.

EXAMPLE 6

[2,4-dimethyl-5-(2-methylenebutyryl)phenoxy] acetonitrile

STEP A: 2',4'-DIMETHYL-5'-HYDROXYBUTYROPHENONE 2,4 - dimethyl - 5 - aminobutyrophenone (119.5 g., 0.63 mole) [C.A., Vol. 16: p. 414[5]] in a solution of 190 cc. of sulfuric acid and 945 cc. of water is diazotized at 5° C. with 46 g. (0.67 mole) of sodium nitrite. The resulting diazonium salt solution is then heated on a steam bath for 30 minutes. The phenol separates as an oil which crystallizes when the mixture is cooled and the said product is taken up in ether, extracted into a 5% sodium hydroxide solution and reprecipitated by acidification with dilute hydrochloric acid. Recrystallization from ethanol gives 76.5 g. of 2',4'-dimethyl-5'-hydroxybutyrophenone, M.P. 95–100° C. A small sample recrystallized from ethanol for analysis gives a melting point of 100.5–102° C.

Analysis for $C_{12}H_{16}O_2$.—Calculated: C, 74.97; H, 8.39. Found: C, 74.41; H, 8.29.

STEP B: 2-METHYLENE-2',4'-DIMETHYL-5'-HYDROXYBUTYROPHENONE

By substituting the 2',4'-dimethyl-5'-hydroxybutyrophenone of Step A for the 2'-chloro-4'-hydroxybutyrophenone of Example 1, Step D, and following substantially the procedure described therein, the compound 2-dimethylaminomethyl - 2',4' - dimethyl - 5' - hydroxybutyrophenone hydrochloride is prepared; which amine is then treated according to the procedure described in Step E of Example 1 to produce the compound 2-methylene-2',4'-dimethyl-5'-hydroxybutyrophenone.

STEP C: [2,4-DIMETHYL-5-(2-METHYLENEBUTYRYL) PHENOXY]-ACETONITRILE

By substituting 2',4'-dimethyl-5'-hydroxybutyrophenone for the 2-methylene-2'-chloro-4'-hydroxybutyrophenone of Example 1, Step F, and following substantially the procedure described therein, the product [2,4-dimethyl-5-(2-methylenebutyryl)phenoxy]acetonitrile is obtained.

EXAMPLE 7

(4-chloro-5-methacryloylphenoxy)acetonitrile

STEP A: 2'-CHLORO-5'-NITROPROPIOPHENONE

2'-chloropropiophenone (84.5 g., 0.5 mole) is added to 300 cc. of fuming nitric acid (d. 1.4) at a temperature of 5 to 10° C. during 18 minutes. The mixture is allowed to stand at 0–5° C. for 30 minutes and then poured into ice water. The solid product is recrystallized from isopropyl alcohol to obtain 75 g. of 2'-chloro-5'-nitropropiophenone, M.P. 52–56° C. After recrystallization from isopropyl alcohol the product melts at 54–56° C.

Aanlysis for $C_9H_8ClNO_3$.—Calculated: C, 50.60; H, 3.77; N, 6.56. Found: C, 51.47; H, 4.01; N, 6.62.

STEP B: 2'-CHLORO-5'-AMINOPROPIOPHENONE

A solution of 2'-chloro-5'-nitropropiophenone (25.9 g., 0.121 mole) in 60 cc. of acetic acid is added to 240 cc. of a 7.5 N hydrochloric acid solution in which is dissolved 100 g. of stannous chloride dihydrate. The solution is heated one hour on the steam bath and then made basic by the addition of a sodium hydroxide solution. The oily product is then taken up in ether and evaporated to obtain 18.0 g. of a yellow oil identified as 2'-chloro-5'-aminopropionphenone. This material is purified by collecting the fraction boiling at 143–146° C./0.5 mm.

Analysis for $C_9H_{10}ClNO$.—Calculated: C, 58.86; H, 5.49; N, 7.63. Found: C, 59.10; H, 5.58; N, 7.54.

STEP C: 2'-CHLORO-5'-HYDROXYPROPIOPHENONE

2'-chloro-5'-aminopropiophenone (48.5 g., 0.26 mole) is dissolved in 192 cc. of water and 26 cc. of concentrated sulfuric acid and diazotized with a solution of 17.9 g. (0.26 mole) of sodium nitrite in 40 cc. of water. The diazonium mixture is then added dropwise during 30 minutes to a stirred mixture of 340 cc. of 1 N sulfuric acid containing 48.0 g. of cupric sulfate pentahydrate, and 250 cc. of toluene.

The toluene layer is then separated and extracted with a 5% solution of sodium hydroxide and acidified with hydrochloric acid to obtain an oily product which is purified by distillation. There is thus obtained 13.0 g. of 2'-chloro-5'-hydroxypropiophenone, B.P. 135–140° C./0.5 mm.

STEP D: 2-METHYL-2'-CHLORO-5'-HYDROXYACRYLOPHENONE

By substituting the 2'-chloro-5'-hydroxypropiophenone of Step C for the 2'-chloro-4'-hydroxybutyrophenone of Example 1, Step D, and following substantially the procedure described therein the compound 2-dimethylaminomethyl-2'-chloro-5'-hydroxypropiophenone hydrochloride is prepared, which amine is then treated according to the procedure described in Step E of Example 1 to produce the compound 2 - methyl-2'-chloro-5'-hydroxyacrylophenone.

STEP E: (4-CHLORO-5-METHACRYLOYLPHENOXY) ACETONITRILE

By substituting 2-methyl-2'-chloro-5'-hydroxyacrylophenone for the 2-methylene-2'-chloro-4'-hydroxybutyrophenone of Example 1, Step F, and following substantially the procedure described therein, the product (4-chloro-5-methacryloylphenoxy)acetonitrile is obtained.

EXAMPLE 8

[2-(2-methylenebutyryl)-3,5-dichlorophenoxy] acetonitrile

STEP A: 2',4'-DICHLORO-6'-HYDROXYBUTYROPHENONE

To a solution of 3,5-dichlorophenol (24.4 g., 0.15 mole) in 60 cc. of pyridine is added, over a 15-minute period while cooling on an ice bath, 19.3 g. (0.18 mole) of butyryl chloride. The mixture is permitted to stand one hour at room temperature and then diluted with 300 cc. of water. The oily product is then taken up in ether and the ether solution washed thoroughly with dilute hydrochloric acid and water, dried and the ether evaporated to leave 33.2 g. of the butyric acid ester of 3,5-dichlorophenol in the form of a liquid.

The butyric acid ester of 3,5-dichlorophenol is mixed with 38.5 g. (0.29 mole) of aluminum chloride and the mixture heated 1.6 hours on the steam bath. The reaction mixture then is poured onto ice and the solid product obtained is recrystallized from ligroin to obtain 21.5 g. of 2',4'-dichloro-6'-hydroxybutyrophenone, M.P. 45–48° C. A small sample recrystallized further from ligroin gives a constant M.P. of 47–48.5° C.

Analysis for $C_{10}H_{10}Cl_2O_2$.— Calculated: C, 51.52; H, 4.32. Found: C, 52.37; H, 4.35.

STEP B: 2-METHYLENE-2',4'-DICHLORO-6'-HYDROXYBUTYROPHENONE

By substituting 2',4'-dichloro-6'-hydroxybutyrophenone for the 2'-chloro-4'-hydroxybutyrophenone of Example 1, Step D, and following substantially the procedure described therein the compound 2-dimethylaminomethyl-2',4'-dichloro-6'-hydroxybutyrophenone hydrochloride is prepared; which amine is then treated according to the procedure described in Step E of Example 1 to produce the compound 2-methylene-2',4'-dichloro-6'-hydroxybutyrophenone.

STEP C: [2-(2-METHYLENEBUTYRYL)-3,5-DICHLOROPHENOXY] ACETONITRILE

By substituting 2-methylene-2',4'-dichloro-6'-hydroxybutyrophenone for the 2-methylene-2'-chloro-4'-hydroxybutyrophenone of Example 1, Step F, and following substantially the procedure described therein, the product [2-(2 - methylenebutyryl)-3,5-dichlorophenoxy]acetonitrils is obtained.

EXAMPLE 9

[2,4-dichloro-3-(2-methylenebutyryl)phenoxy] acetonitrile

STEP A: 2,6-DICHLORO-3-METHOXY-α-PROPYLBENZYL ALCOHOL 2,6-dichloro-3-methoxybenzaldehyde (109 g., 0.53 mole) is added to a solution of propylmagnesium bromide [prepared by the reaction of 72.4 g. (0.59 mole) of propyl bromide with 14.4 g. (0.59 mole) of magnesium] in 600 cc. of ether over a period of ½ hour. The mixture is refluxed for 1½ hours and poured into ice-cold dilute hydrochloric acid. The ether layer is then separated, washed with water, dried over sodium sulfate and evaporated to give 126 g. of a yellow oil identified as 2,6-dichloro-3-methoxy-α-propylbenzyl alcohol.

STEP B: 2',6'-DICHLORO-3'-METHOXYBUTYROPHENONE

A solution of 2,6-dichloro-3-methoxy-α-propylbenzyl alcohol (126 g., 0.51 mole) and sodium dichromate dihydrate (98.5 g., 0.33 mole) in 150 cc. of water and 400 cc. of acetic acid is heated one hour on the steam bath. The solution is diluted with 2.5 liters of water to produce an oily product which is then taken up in ether, the ether solution washed with water and sodium bicarbonate solution and then dried over sodium sulfate. Evaporation of the ether gives 119 g. of 2',6'-dichloro-3'-methoxybutyrophenone in the form of a yellow oil.

STEP C: 2',6'-DICHLORO-3'-HYDROXYBUTYROPHENONE

A mixture of 2',6'-dichloro-3'-methoxybutyrophenone (119 g., 0.48 mole) and aluminum chloride (191 g., 1.44 mole) in 600 cc. of heptane is stirred and heated for 2½ hours on the steam bath. The heptane is decanted from viscous precipitate and the precipitate hydrolyzed by the addition of ice in dilute hydrochloric acid. The oily product obtained is then taken up in ether and purified by distillation to give 76.5 g. of 2′,6′-dichloro-3′-hydroxybutyrophenone, B.P. 148–150° C./1.5 mm. $n_D^{26}$ 1.5558.

Analysis for $C_{10}H_{10}Cl_2O_2$.—Calculated: C, 51.52; H, 4.32. Found: C, 51.67; H, 4.57.

STEP D: 2-METHYLENE-2′,6′-DICHLORO-3′-HYDROXYBUTYROPHENONE

By substituting 2,6-dichloro-3-hydroxybutyrophenone for the 2′-chloro-4′-hydroxybutyrophenone of Example 1, Step D, and following substantially the procedure described therein, the compound 2-dimethylaminomethyl-2′,6′-dichloro-3′-hydroxybutyrophenone hydrochloride is prepared; which amine is then treated according to the procedure described in Step E of Example 1 to produce the compound 2-methylene-2′,6′ - dichloro-3′-hydroxybutyrophenone.

STEP E: [2,4-DICHLORO-3-(2-METHYLENEBUTYRYL) PHENOXY]-ACETONITRILE

By substituting 2-methylene-2′,6′-dichloro-3′-hydroxybutyrophenone for the 2-methylene-2′-chloro-4′-hydroxybutyrophenone of Example 1, Step F, and following substantially the procedure described therein, the product [2,4 - dichloro - 3 - (2-methylenebutyryl)phenoxy]acetonitrile is obtained.

EXAMPLE 10

[3-trifluoromethyl-4-(2-methylenebutyryl)phenoxy]acetonitrile

STEP A: 3-TRIFLUOROMETHYL-4-BROMOPHENYL ALLYL ETHER 3-trifluoromethyl-4-bromophenol (12.05 g., 0.05 mole) dissolved in methanol is added to a solution of 2.81 g. (0.05 mole) of potassium hydroxide in 35 ml. of an 85% methanol solution. The methanol is evaporated and the residue is dissolved in 50 ml. of glycol dimethyl ether (i.e., glyme). Allyl bromide (6.05 g., 0.05 mole) is added and the mixture is refluxed for 1½ hours. After removal of the potassium bromide, the solvent is evaporated and the residue distilled to obtain 10.5 g. of 3-trifluoromethyl-4-bromophenyl allyl ether, B.P. 78° C./1 mm.

STEP B: 3-TRIFLUOROMETHYL-4-(1-HYDROXYBUTYL)PHENYL ALLYL ETHER

To a mixture of 2.60 g. (0.14 mole) of magnesium turnings in 150 ml. of ether there is added 20 g. (0.0712 mole) of 3-trifluoromethyl-4-bromophenyl allyl ether. The reaction is initiated and maintained by the slow addition of 12.4 g. (0.0712 mole) of ethylene bromide. After the magnesium has been consumed, 5.12 g. (0.712 mole) of butyraldehyde is added and the mixture is refluxed 1½ hours, cooled and added to a saturated ammonium chloride solution. The product is isolated by extraction with ethyl ether and the ether extract distilled to obtain 11.0 g. of an oil having a boiling point of 70–102° C./0.3 mm. The oil (7.92 g.) is placed on a 4 cm. column of 350 g. of alumina and eluted with benzene until the effluent contains no solute. The product is then eluted with a 2:1 mixture of benzene and ether and then with a 1:2 mixture of benzene and ether until the effluent contains no solute. The combined benzene-ether effluents are evaporated to obtain 5.5 g. of 3-trifluoromethyl-4-(1-hydroxybutyl)phenyl allyl ether ($n_D^{25}$ 1.4836).

STEP C: 2′-TRIFLUOROMETHYL-4′-ALLYLOXYBUTYROPHENONE 3-trifluoromethyl-4-(1-hydroxybutyl)phenyl allyl ether (5.3 g., 0.0193 mole) is dissolved in 30 ml. of acetone and the solution maintained at 0° C. while a solution of 3.86 g. (0.0396 mole) of chromium trioxide in a mixture of 10 ml. of water and 3.26 ml. of concentrated sulfuric acid is added slowly with stirring. After stirring for an additional two hours, cold water is added and the mixture is extracted with ether. After drying the extract thus obtained with sodium sulfate, the ether is evaporated and the residue distilled at 0.3 mm. to yield 4.9 g. of 2′-trifluoromethyl-4′-allyloxybutyrophenone.

STEP D: 2-METHYLENE-2′-TRIFLUOROMETHYL-4′-HYDROXYBUTYROPHENONE

By substituting 2′-trifluoromethyl-4′-allyloxybutyrophenone for the 2′-chloro-4′-hydroxypropionphenone of Example 6, Step B, and following substantially the procedure described in Steps B and C of that example, the compound 2-methylene-2′ - trifluoromethyl - 4′-allyloxybutyrophenone is prepared. Hydrolysis of the 2-methylene-2′-trifluoromethyl-4′-allyloxybutyrophenone thus obtained in the conventional manner yields 2-methylene-2′-trifluoromethyl-4′-hydroxybutyrophenone.

STEP E: [3-TRIFLUOROMETHYL-4-(2-METHYLENEBUTYRYL)PHENOXY]-ACETONITRILE

By substituting 2-methylene-2′-trifluoromethyl-4′-hydroxybutyrophenone for the 2-methylene-2′-chloro-4′-hydroxybutyrophenone of Example 1, Step F, and following substantially the procedure described therein, the product [3-trifluoromethyl-4 - (2 - methylenebutyryl)phenoxy] acetonitrile is obtained.

In a manner similar to that described in Example 1 for the preparation of [3-chloro-4-(2-methylenebutyryl) phenoxy]acetonitrile, all of the [(2-alkylideneaklanoyl) phenoxy[acetonitriles (I) of the invention may be obtained. Thus, by substituting the appropriate nuclear hydroxy substituted alkanophenone and secondary amine hydrochloride for the 2′-chloro-4′-hydroxybutyrophenone and dimethylamine hydrochloride of Example 1, Step D and following substantially the procedure described in Steps D, E and F of that example, all of the products (I) of the invention may be obtained. The following equations illustrate the reaction of Example 1, Steps D, E and F and together with Table I, infra, depict the nuclear hydroxy substituted alkanophenone and secondary amine hydrochloride reactants of the process and the corresponding [(2-alkylidenealkanoyl)phenoxy]acetonitrile products produced thereby:

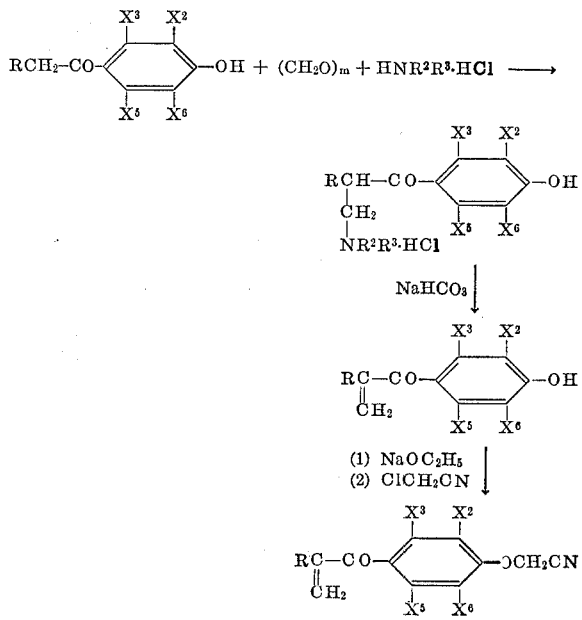

TABLE I

| Ex. | R | $R^2$ | $R^3$ | $X^2$ | $X^3$ | $X^5$ | $X^6$ |
|---|---|---|---|---|---|---|---|
| 11 | —(thiophene) | —$CH_3$ | —$CH_3$ | H | Cl | H | H |
| 12 | —$C_2H_5$ | —$CH_3$ | —$CH_3$ | —CH=CH—CH=CH— | | H | H |
| 13 | —$CH_2$—(phenyl) | —$CH_3$ | —$CH_3$ | H | Cl | H | H |
| 14 | —(phenyl) | —$CH_3$ | —$CH_3$ | H | Cl | H | H |
| 15 | —$C_2H_5$ | —$CH_2$—$(CH_2)_3$— | —$CH_2$— | —$CH_3$ | Cl | H | H |
| 16 | —$C_2H_5$ | —$CH_3$ | —$CH_3$ | Cl | —$CH_3$ | H | H |
| 17 | —$CH(CH_3)_2$ | —$CH_2$—$(CH_2)_3$— | —$CH_2$— | H | Cl | H | H |
| 18 | —$CH(CH_3)_2$ | —$CH_3$ | —$CH_3$ | Cl | Cl | H | H |
| 19 | —$CH_2CF_3$ | —$CH_3$ | —$CH_3$ | —$CH_3$ | —$CH_3$ | H | H |
| 20 | —$CH(CH_3)(CF_3)$ | —$CH_3$ | —$CH_3$ | H | —$CH_3$ | H | H |
| 21 | —$C_2H_5$ | —$CH_2$—$(CH_2)_3$— | —$CH_2$— | H | —$CH_3$ | —$CH_3$ | H |
| 22 | —$C_2H_5$ | —$CH_3$ | —$CH_3$ | —$CH_3$ | —$CH_3$ | —$CH_3$ | —$CH_3$ |
| 23 | —(phenyl)—$CH_3$ | —$CH_3$ | —$CH_3$ | H | Cl | H | H |
| 24 | —$CH_2$—(phenyl)—Cl | —$CH_3$ | —$CH_3$ | H | Cl | H | H |
| 25 | —(thiophene) | —$CH_3$ | —$CH_3$ | H | Cl | H | H |
| 26 | —$C_2H_5$ | —$CH_3$ | —$CH_3$ | —$CH_3$ | —$CH_3$ | —$CH_3$ | H |

The products of the invention can be administered in a wide variety of therapeutic dosages in conventional vehicles as, for example, by oral administration in the form of an oral suspension, or syrup, as well as by intravenous injection. Also, the dosage of the products may be varied over a wide range as, for example, at dosages containing from 5 to about 500 milligrams, of the active ingredient for the symptomatic adjustment of the dosage to the patient to be treated.

A suitable unit dosage form of the products of this invention can be administered by mixing 10 mg. of a 2-alkylidenealkanoylphenoxy acetonitrile (I) with a mixture of tragacanth, sorbic acid, 95% ethyl alcohol USP, sorbitol solution USP, tartrazine, FD & C Yellow #5, a suitable flavor and distilled water. Similarly, by employing more of the active ingredient other dosage forms can be obtained.

It is also within the scope of this invention to combine two or more of the products of this invention in a unit dosage form or to combine one or more of the compounds with other known diuretics and saluretics or with other desired therapeutic and/or nutritive agents in dosage unit form.

The following example is included to illustrate the preparation of a representative dosage form:

EXAMPLE 27

Oral suspension containing 10 mg. of active ingredient per ml.

Ingredients:                                    Amount per 5 ml.

[3-chloro-4(2-methylenebutylryl)-phenoxy]-
  acetonitrile _____mg__    10.0
Tragacanth, USP granular _____percent__          0.25
Sorbic acid, food grade _____do____        0.10
Antifoam AF emulsion _____do____        0.003
Ethyl alcohol USP 95% ____percent v./v__          1.0
Sorbitol solution USP _____do____       50.0
Tartrazine, FD & C Yellow #5 ____percent__        0.005
Pineapple coconut flavor #532 (Plok's Frutal
  Works) _____percent v./v__         0.1
Distilled water, q.s. ad 5 ml.

Place 55 liters of distilled water in a small Pfaudler flask and add with agitation 475 gm. of tragacanth (USP Granular). Agitation is continued for one hour and the resulting gel allowed to hydrate overnight.

Antifoam AF emulsion (5.7 gm.) is dispersed in 0.38 liters of distilled water and the solution added to the gel of the preceding paragraph. The mixing container is then rinsed with 0.1 liter of distilled water and the rinsings added to the gel and antifoam solution and mixed thoroughly. The gel then is strained through a #40 stainless steel screen into a portable stainless steel container. The Pfaudler flask is rinsed with 2.5 liters of distilled water and the rinsings collected. Approximately 7.5 liters of strained gel is removed and added slowly to the [3-chloro-4 - (2 - methylenebutyryl)phenoxy]acetonitrile (379 g.) with mixing. Mixing is continued until all of the powders have been wetted and no lumps remain so as to obtain a concentrate.

The concentrate is added to the bulk with agitation. The mixing bowl is rinsed with approximately 1.5 liters of the gel and the rinsings added to the bulk. Pineapple Coconut Flavor #532 (190 ml.) is added with agitation into the combined suspension of [3-chloro-4-(2-methylenebutyryl)-phenoxy]acetonitrile and tragacanth gel in the portable stainless steel container. The FD & C yellow #5 (9.5 gm.) is dissolved in 250 ml. of distilled water and added with agitation to the bulk. The container then is rinsed with 250 ml. of distilled water and the rinsings again added to the bulk. The mixture is agitated with a stirrer at medium speed for 25 to 30 minutes.

The mixture of the preceding paragraph is homogenized into 95 liters of sorbitol solution USP in a large Pfaudler flask. Sorbic acid (190 gm.) then is dissolved in ethyl alcohol USP 95% (1.75 liters) with heating to obtain a solution and the solution is added slowly to the bulk with agitation. The mixing container is rinsed with 150 ml. of 95% ethyl alcohol USP and the rinsings added to the bulk with agitation. The product is mixed for 15 minutes using minimal agitation.

The product is brought to a total volume of 190 liters by the addition of sufficient distilled water and mixed for 30 minutes using minimal agitation.

Similar oral suspensions can be prepared by replacing the active ingredient of the above example by any one or more of the other novel compounds of this invention and varying the amounts of the ingredients to obtain the desired dosage.

It will be apparent from the foregoing description that the 2-alkylidenealkanoylphenoxy derivatives of acetonitrile (I) of this invention constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:

1. A compound having the formula:

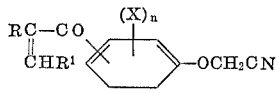

wherein R is a member selected from the group consisting of hydrogen, lower alkyl, trifluoromethyl substituted lower alkyl, cycloalkyl containing 5-6 carbon atoms, phenyl and benzyl wherein the aromatic ring in the said phenyl and benzyl moieties may be substituted in the 4-position by halogen or lower alkyl; $R^1$ is a member selected from the group consisting of hydrogen and lower alkyl; X represents similar or dissimilar members selected from the group consisting of hydrogen, halogen, trifluoromethyl, lower alkyl and, when substituted on adjacent carbon atoms of the benzene nucleus two X radicals may be combined to form an hydrocarbylene chain selected from trimethylene, tetramethylene and 1,3-butadienylene and $n$ is an integer having a value of one to four.

2. A compound having the formula:

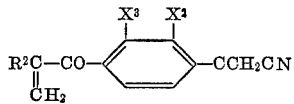

wherein $R^2$ is a member selected from the group consisting of lower alkyl and trifluoromethyl substituted lower alkyl and $X^2$ and $X^3$ are similar or dissimilar members selected from the group consisting of hydrogen, halogen, trifluoromethyl, lower alkyl and, taken together, may be joined to form a 1,3-butadienylene linkage.

3. The product of claim 2 wherein $R^2$ is lower alkyl; $X^2$ is hydrogen and $X^3$ is halogen.

4. The product of claim 2 wherein $R^2$ is lower alkyl and $X^2$ and $X^3$ are halogen.

5. The product of claim 2 wherein $R^2$, $X^2$ and $X^3$ are lower alkyl.

6. The product of claim 2 wherein $R^2$ is lower alkyl, $X^2$ is hydrogen and $X^3$ is trihalofluoromethyl substituted lower alkyl.

7. [3 - chloro - 4 - (2 - methylenebutyryl)phenoxy] acetonitrile.

8. [2,3 - dichloro - 4 - (2-methylenebutyryl)phenoxy] acetonitrile.

References Cited

UNITED STATES PATENTS

| | | | |
|---|---|---|---|
| 2,676,968 | 4/1954 | Burtner | 260—465 X |
| 3,139,455 | 6/1964 | Campbell | 260—465 X |
| 3,255,241 | 6/1966 | Schultz et al. | 260—516 |

OTHER REFERENCES

Grochowski et al., Chemical Abstracts, 1964, vol. 60, p. 2815.

Morison et al., Organic Chemistry, 1959, pp. 412–413.

CHARLES B. PARKER, *Primary Examiner.*

S. T. LAWRENCE III, *Assistant Examiner.*

U.S. Cl. X.R.

167—65; 260— 570.5, 570.8, 567.6, 590, 592, 599, 600, 612, 613, 621, 623